No. 636,659. Patented Nov. 7, 1899.
E. H. GRIM.
PLANTER.
(Application filed Sept. 8, 1898.)
(No Model.) 2 Sheets—Sheet 1.
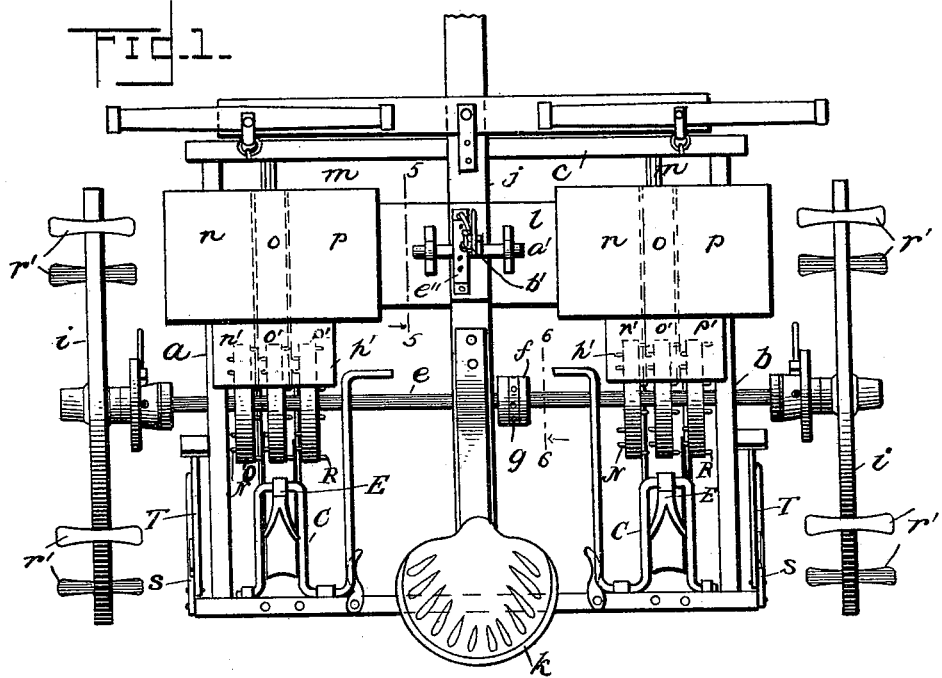
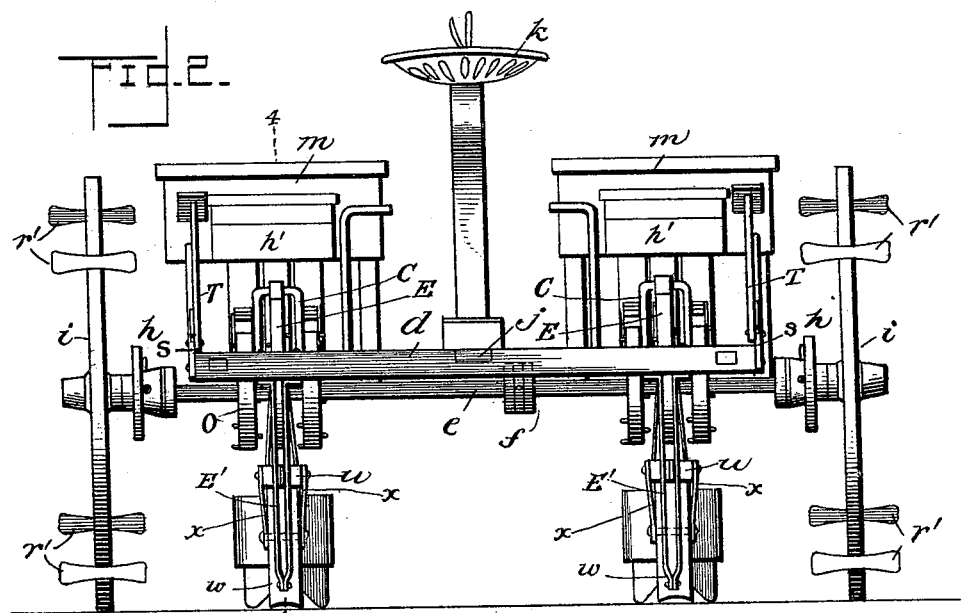
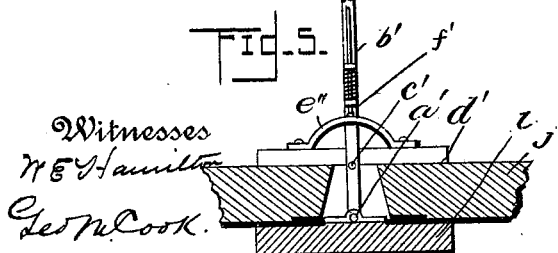
Witnesses
W E Hamilton
Geo N Cook
Inventor
Edward H. Grim
by
Chandler & Chandler
Attorneys
THE NORRIS PETERS CO., PHOTO-LITHO., WASHINGTON, D. C.

No. 636,659. Patented Nov. 7, 1899.
E. H. GRIM.
PLANTER.
(Application filed Sept. 8, 1898.)
(No Model.) 2 Sheets—Sheet 2.
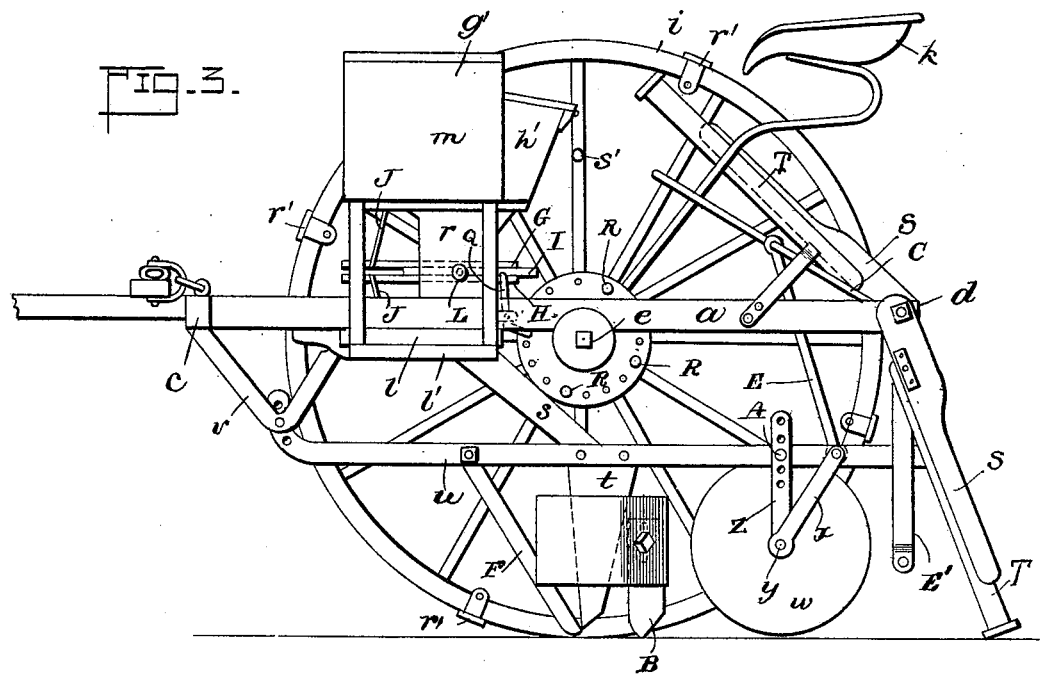
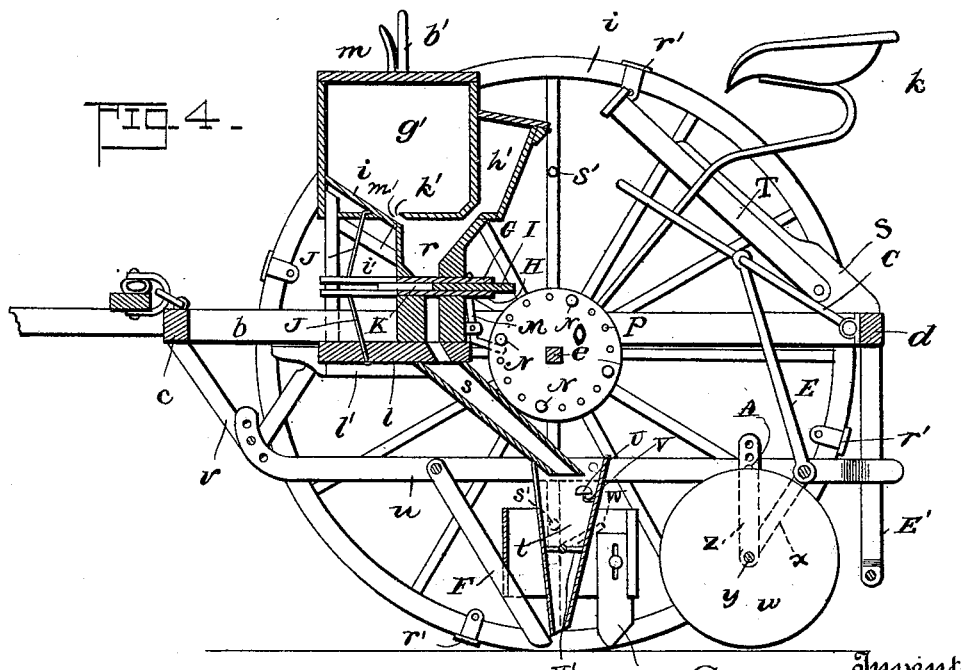
Witnesses
W. E. Hamilton
Geo. M. Cook
Inventor
Edward H. Grim
by
Chandlee & Chandlee
Attorneys

UNITED STATES PATENT OFFICE.

EDWARD H. GRIM, OF EAST RADFORD, VIRGINIA.

PLANTER.

SPECIFICATION forming part of Letters Patent No. 636,659, dated November 7, 1899.

Application filed September 8, 1898. Serial No. 690,484. (No model.)

*To all whom it may concern:*

Be it known that I, EDWARD H. GRIM, a citizen of the United States, residing at East Radford, in the county of Montgomery, State of Virginia, have invented certain new and useful Improvements in Planters; and I do hereby declare the following to be a full, clear, and exact description of the invention, such as will enable others skilled in the art to which it appertains to make and use the same.

My invention relates to planters, and has for its object to provide a machine which will be entirely automatic in its operation, which will simultaneously plant one or more kinds of seed and will at the same time deposit fertilizer, and, moreover, may be readily regulated to drop the required amount of fertilizer and seed.

A further object of my invention is to provide a machine of the class mentioned which will be self-marking and which may be arranged to drill any distance desired.

A final object of my invention is to provide a machine which will be adapted to check corn without the aid of any exterior agent—such as the usual knotted cord, wire, &c.—and which, moreover, may be altered to check or not, as desired.

In the drawings forming a portion of this specification, and in which like letters of reference indicate similar parts in the several views, Figure 1 is a plan view of my complete machine. Fig. 2 is a rear elevation of my machine. Fig. 3 is a side elevation of my machine. Fig. 4 is a section on line 4 4 of Fig. 2, looking to the right. Fig. 5 is a section on line 5 5 of Fig. 1, looking in the direction of the arrow.

Referring now to the drawings, in operating in accordance with my invention I provide a frame comprising sides $a$ and $b$ and front $c$ and back $d$, upon the lower sides of which side pieces is journaled a revoluble axle $e$, having fixed thereto, approximately at its middle point, a drum $f$, having perforations $g$ for a purpose as will be presently explained. Arranged upon each end of the axle $e$ and connected thereto through the medium of a ratchet $h$, of ordinary construction, is a wheel $i$, said ratchets being arranged to turn the axle with the wheels when the latter are moving in a forward direction. Thus when the machine is turned at the end of a row upon one wheel as a pivot the axle will remain stationary and the mechanism of the machine hereinafter described will lie dormant.

Running longitudinally of the frame of the machine is a seat-board $j$, carrying the usual seat and standard $k$ for the operator.
Transversely of the frame of the machine is arranged a base-board $l$, upon which are arranged hoppers $m$. The base-board $l$ is adapted to be moved forwardly and rearwardly of the machine, and for this purpose the ends thereof lie within slideways $l'$, secured to the side pieces $a$ and $b$ of the frame.

Referring to Fig. 5 of the drawings, in order to shift the base-board, as above mentioned, I pivot thereto at $a'$ a lever $b'$, having pivotal connection at $c'$ with a block $d'$ upon the seat-board $j$. A notched segment $e''$, secured to the block $d'$, is adapted to receive a spring-pressed bolt $f'$, carried by the lever and adapted to be raised out of engagement with the segment by means of a trigger of the usual form. Thus it will be seen that when the lever $b'$ is moved forwardly the base-board will be moved rearwardly, together with the mechanism carried thereby.

The hoppers $m$ are each formed in two parts—a major part $g'$ and a minor part $h'$—which said parts are themselves each divided by vertical partitions into compartments $n$, $o$, $p$, $n'$, $o'$, and $p'$, respectively.

Referring now more particularly to Figs. 3 and 4 of the drawings, extending downwardly from each compartment of each main hopper part $g'$ is a throat $r$, into which the main and secondary compartments empty, the lower end of the throat terminating in a delivery-tube $s$, as shown, which enters a boot $t$ directly under the axle $e$. The boot $t$ is secured to a drag-bar $u$, pivoted at its forward end to a brace $v$, depending from the frame of the machine, the rear end of which drag-bar is supported by a roller $w$, which roller is journaled in the ends of arms $x$, pivotally connected to the drag-bar $u$, whereby the said roller may be swung forwardly or backwardly, and thus be raised or lowered with respect to the lever, to allow the lever to approach or cause it to recede from the ground, and thus raise or lower the boot $t$ and adjacent parts hereinafter described. In order to hold the roller $w$ in its adjusted position, I pivotally connect with the end of the axle $y$ of the roller $w$ a rod $z$, having perforations therein to receive a pin A, passed through a perforation in the drag-bar $u$. Thus it will be seen that the pin, which may be in the form of a bolt, may be withdrawn and the roller adjusted, after which it may be replaced and will hold the roller in position. Inclosing the boot $t$, save for a space at the back, is a shield having an angular front edge, which shield is so located with respect to the boot that it will escape the edges of the furrow and prevent foreign matter striking the boot and displacing or otherwise injuring its operation. Secured to the guard at the edges of the rear opening thereof and extending downwardly therefrom are coverers B, pointed at their lower ends and arranged at an angle to the direction of motion of the machine and positioned to enter the earth at the sides of the furrow and as the machine moves forward to shove the dirt inwardly and over the seeds that have passed from the hopper.

In order to insure proper planting of the seeds where the furrow is broken and the earth is hard, or where from any other cause the seeds cannot be properly placed, a lever C is pivotally connected with the rear piece $d$ of the frame, which lever is connected through the medium of a link E with the rear portion of the drag-bar $u$. As shown in Fig. 2 of the drawings, the drag-bar $u$ is formed double or pronged, the boot $t$ being arranged between the two elements of the drag-bar, the rear ends of the drag-bar inclosing a rigid guide E', depending from the rear piece $d$ of the frame, to prevent lateral derangement of the drag-bar and the mechanism carried thereby. A colter F, secured to the drag-bar $u$, extends downwardly at an angle in front of the boot $t$ and affords protection for the tip of the boot, preventing the accumulation of grass or weeds thereon.

Referring now to the hoppers $m$, the divisions $n$, $o$, and $p$ are each provided at their forward portions with a slanting floor $i$. A slot $k'$ in the horizontal floor $m'$ of the compartment allows the contents of the section to drop upon the extension of the floor-piece $i'$ and thence into the space therebelow. An opening in each compartment $n'$, $o'$, and $p'$ leads into the throat of its corresponding division $n$, $o$, and $p$, respectively. Arranged in the throat of each hopper-division are two slides G and H, each having an opening therein and separated by a slidable plate I, said slides and plate moving through slots in the throat. In order to hold the slides normally in such a position that their openings will lie outside the throat and will allow no material to pass therethrough, I arrange a spring J for each slide, the spring for the upper slide G being secured at its upper end to the bottom of the hopper and the spring for the lower slide being secured at its base to the board $l$. In order to regulate the size of the space intermediate the slides G and H within the throat, the plate I is provided. This plate I has a slot in it, as shown at K, and by moving the plate inwardly the size of the space is diminished. In order to hold the plate I in its adjusted position, a set-screw L is passed through the side of the throat and engages the plate. In order to operate the slides successively, first the top slide, to allow material to drop into the space K, and then slide H, to allow it to pass therefrom, I pivot to projections on the side of the throat a lever M, having its upper end pivotally connected with the upper slide G and its lower end curved downwardly and rearwardly and adapted to engage successively a series of pins N, carried by a drum O, arranged upon and to revolve with the axle $e$ of the machine. In the drawings I have shown four of these pins N, although, as will be readily understood, as many may be used as desired, openings P being shown for the insertion of additional pins in the drum. A second lever Q, pivoted also to the throat, has its upper end connected with the lower slide H, its lower end being curved downwardly and rearwardly to engage pins R on the opposite side of the drum O. These pins are so located that the upper slide will be drawn and released to allow material to enter the space K before the lower slide is drawn and released, as will be readily understood. It will be noted that this mechanism is duplicated in connection with the two hoppers and their compartments and divisions.

In order to mark the furrows, that the seed may be planted regularly without the aid of a knotted cord or other usual measuring means, I secure a cleat $r'$ to each wheel of the machine at intervals, which cleats are the same in number as the operating-pins N and R and mark the earth regularly as the machine proceeds. Upon the spokes of the wheels, corresponding to the cleats $r'$, are secured knockers $s'$, which revolve with the wheels and into whose path of rotation extends an extension W of a valve V', pivoted within the throat and adapted when closed to prevent passage of material through the throat. Thus simultaneously with the marking of the furrow by a cleat $r'$ a knocker $s'$ will strike the extension W, opening the valve V' and discharging the contents of the throat into the furrow, the knockers operating subsequent to the operation of the slide above.

When it is not desired to use the machine for checking, the valve and its coöperating mechanism may be omitted.

In order that the operator may have evidence of the operation of the hopper mechanism, I arrange within the boot, below the slides, a bell U, supported upon a bracket V, directly under the mouth of the tube *s* to be struck by the discharge therefrom and be thus sounded when the mechanism is in operation and material is being properly discharged.

It will be readily understood that I may vary the specific form and arrangement of my machine without departing from the spirit of my invention.

In order to raise the wheels from the ground to insure their proper marking when retracking, I pivotally secure to each corner of the machine-frame and at the rear thereof a simple form of lifting-jack comprising toggle-levers S and T, as shown, which when not in use may be folded up and over the frame to rest in inoperative positions, as shown in Figs. 3 and 4. Thus it will be seen that by manipulation of the jacks the inside wheel on a return trip may be revolved to cause one of its cleats to register with the mark at the end of the last trip and that the other wheel may be manipulated to assume a corresponding position, after which jacks may be raised out of the way and the machine driven to the opposite end of the field; also, that should the operator by observation discover that the inside wheel-cleats are not coinciding with the marks made on the previous trip he may dismount and swing the wheels into proper positions. It will be further noted that when it is desired to throw the levers M and Q out of operation with respect to the pins N it is only necessary to manipulate the shifting-lever *b'*, through the medium of which the base-board is moved.

Having thus described my invention, what I claim is—

1. In a planting-machine, the combination with hoppers of throats leading therefrom, slides within the throats having openings therein, means for bringing said openings alternately into operative relation with the throats to discharge material from the hopper, and alarms arranged to receive the discharge from the hoppers.

2. In a planting-machine, the combination with hoppers of throats leading therefrom, slides in each throat having each an opening therein, a lever connected with each slide, supporting-wheels for the machine having an axle rotatable therewith, drums carried by the axle, and pins on said drums adapted to engage the levers.

3. In a planting-machine the combination with hoppers of throats leading therefrom, slides in each throat having each an opening, a lever connected with each slide, supporting-wheels for the machine having an axle rotatable therewith, drums carried by the axle, said drums having pins adapted to engage the said levers successively, a boot adapted to receive the discharge from each hopper, a colter in advance of each boot, coverers following the boots, and means for raising and lowering the boots, the coverers and colters.

4. In a planting-machine, the combination with hoppers of throats leading therefrom, slides in each throat having each an opening, a lever connected with each slide, supporting-wheels for the machine having an axle rotatable therewith, drums carried by the axle, said drums having pins adapted to engage said levers successively, boots adapted to receive the discharge from the throats, levers supporting the boots, coverers following the boots and carried by the levers, colters in advance of the boots, rollers adjustably connected with the levers, means for adjusting the rollers and means for adjusting the levers.

5. In a planting-machine adapted for automatic checking, the combination of a frame having supporting-wheels, hoppers carried by the frame, throats leading from the hoppers, slides in the throats adapted to open and close the throats to permit passage of material therethrough, connections between said slides and the wheels for operating the slides, valves below the slides to prevent passage of the material from the throats, knockers arranged to operate the valves, and cleats upon the wheels adapted to mark simultaneously with the operation of the valves.

6. In a planting-machine adapted for automatic checking, the combination of a frame having supporting-wheels, which wheels are independently movable, hoppers carried by the frame, throats leading from the hoppers, slides in the throats adapted to open and close the throats to permit passage of material therethrough, connections between said slides and wheels for operating the slides, valves below the slides, knockers arranged to operate the valves, cleats upon the wheels adapted to mark simultaneously with the operation of the valves, and means for moving the slides into and out of operation with the wheels.

7. In a planting-machine adapted for automatic checking, the combination of a frame having an axle journaled therein, supporting-wheels carried by the axle and having ratchet connections therewith, hoppers carried by the frame, throats leading from the hoppers, an upper and a lower slide within each throat, connections between the slides and the wheels for operating the slides, a third slide intermediate the upper and lower slide adapted to vary the space therebetween, valves below the slides, knockers arranged to operate the valves, cleats upon the wheels adapted to mark simultaneously with the operation of the valves, and means for moving the slides into and out of operative connection with the wheels.

8. In a planting-machine, the combination of a frame having supporting-wheels, hoppers carried by the frame, discharge apparatus having operative connections with supporting-wheels carried by the frame, a throat leading from each hopper, a lever pivoted to the frame, a boot carried by the lever arranged to receive discharge from the adjacent throats and convey it to the furrow, a colter in advance of each boot and secured to the lever, a coverer in the rear of each boot, a roller adjustably connected with the lever and adapted to roll the furrow after engagement of the coverer, and means for operating the lever to raise and lower the mechanism carried thereby.

In testimony whereof I affix my signature in presence of two witnesses.

EDWARD H. GRIM.

Witnesses:
 JOS. GRAHAM, Jr.,
 E. C. BAIN.